(12) United States Patent
Liu et al.

(10) Patent No.: US 10,384,272 B2
(45) Date of Patent: *Aug. 20, 2019

(54) LARGE-STROKE TENSIONING DEVICE IN WHEEL MACHINING PROCESS

(71) Applicant: CITIC Dicastal CO., LTD, Qinhuangdao (CN)

(72) Inventors: Weidong Liu, Qinhuangdao (CN); Jiandong Guo, Qinhuangdao (CN); Bowen Xue, Qinhuangdao (CN)

(73) Assignee: CITIC Dicastal CO., LTD, Qinhuangdao (CN)

( * ) Notice: Subject to any disclaimer, the term of this patent is extended or adjusted under 35 U.S.C. 154(b) by 52 days.

This patent is subject to a terminal disclaimer.

(21) Appl. No.: 15/635,652

(22) Filed: Jun. 28, 2017

(65) Prior Publication Data

US 2018/0001394 A1 Jan. 4, 2018

(30) Foreign Application Priority Data

Jun. 29, 2016 (CN) .......................... 2016 1 0492002

(51) Int. Cl.
| | | |
|---|---|---|
| *B23B 31/12* | (2006.01) | |
| *B23B 31/40* | (2006.01) | |
| *B23B 31/173* | (2006.01) | |
| *B23Q 3/06* | (2006.01) | |

(52) U.S. Cl.
CPC .... *B23B 31/4026* (2013.01); *B23B 31/16183* (2013.01); *B23B 2215/08* (2013.01); *B23B 2260/062* (2013.01); *B23B 2260/136* (2013.01); *B23Q 3/068* (2013.01)

(58) Field of Classification Search
CPC .......... B23B 31/16183; B23B 2215/08; B23B 2260/062; B23B 2260/136; B23B 31/14; B23B 31/16158; B23B 31/16233; B23Q 3/068
USPC ........................................................ 279/121
See application file for complete search history.

(56) References Cited

U.S. PATENT DOCUMENTS

| | | | | |
|---|---|---|---|---|
| 5,890,720 A | * | 4/1999 | Antoni .............. | B23B 31/16233 279/110 |
| 2002/0158426 A1 | * | 10/2002 | Kuroda ............. | B23B 31/16233 279/121 |

* cited by examiner

*Primary Examiner* — Sunil K Singh
*Assistant Examiner* — Paul M Janeski
(74) *Attorney, Agent, or Firm* — Maier & Maier, PLLC

(57) ABSTRACT

The invention relates to a large-stroke tensioning device in a wheel machining process. The large-stroke tensioning device in the wheel machining process comprises a base (1), a servo motor (2), a mounting plate (3), a connecting plate (4), a shaft sleeve (5), an oil cylinder (6), a gland (7), bearings (8), a connecting shaft (9), a chassis (10), positioning pins (11), a flange plate (12), springs (13), sliding pedals (14), an expanding core (15), a protector (16) and the like. The large-stroke tensioning device can meet requirements of clamping and positioning of a wheel, and meanwhile has the characteristics of simple structure, convenience in manufacturing, stable performance and capability of meeting machining requirements on precision.

2 Claims, 2 Drawing Sheets

LARGE-STROKE TENSIONING DEVICE IN WHEEL MACHINING PROCESS

TECHNICAL FIELD

The invention relates to a machining device, in particular to a large-stroke tensioning device in a wheel machining process.

BACKGROUND ART

In a wheel machining process, an expanding and shrinking device is used widely, for example, an improved machining center clamp of which the patent number is CN 201470924 U is introduced, the device consists of a power lock and a tightening core, however, the device has the problems of simple structure, short service life, small expanding and shrinking stroke range and the like, meanwhile, aluminum skimmings easily enter an opening of the power lock, and therefore, the machining precision is affected. The invention introduces a high-precision large-stroke tensioning device.

SUMMARY OF THE INVENTION

The invention aims to provide a large-stroke tensioning device in a wheel machining process.

In order to accomplish the above object, a technical scheme of the invention is as follows: a large-stroke tensioning device in the wheel machining process consists of a base, a servo motor, a mounting plate, a connecting plate, a shaft sleeve, an oil cylinder, a gland, bearings, a connecting shaft, a chassis, positioning pins, a flange plate, springs, sliding pedals, an expanding core and a protector. The mounting plate, the gland and the chassis are fixed on the base, the servo motor is mounted on the mounting plate, the shaft sleeve is mounted on the base by the two rows of bearings and the gland, the oil cylinder is fixed in the shaft sleeve, an output end of the oil cylinder is fixed with the connecting shaft, the servo motor is connected with the shaft sleeve by the connecting plate, the expanding core is connected with the shaft sleeve by the connecting shaft, the expanding core, the connecting shaft and the shaft sleeve are locked in the peripheral direction and do not rotate relatively, the connecting shaft and the shaft sleeve can relatively move in the axial direction, the flange plate is fixed on the chassis, eight T-shaped chutes which are distributed uniformly are formed in cavities of the flange plate and the chassis, bottom surfaces of eight sliding pedals are in one-to-one correspondence to the eight T-shaped chutes respectively, the sliding pedals can smoothly slide in the chutes highly precisely, the inner side wall of each sliding pedal is a 15-degree inclined plane, and the flange plate is connected with the eight sliding pedals by eight springs; two groups of 15-degree inclined planes which are uniformly distributed at intervals are arranged on side surfaces of the expanding core, the number of the inclined planes in each group is eight, height difference exists between each two inclined planes, and side walls of the upper ends of the two groups of inclined planes are joined at a conical surface. Under the combined action of the tension of the oil cylinder and the elasticity of the springs, side walls of the sliding pedals are in contact with the conical surface of the expanding core when the expanding core is located at the bottom-most position, the servo motor drives the expanding core to rotate at an angle of 22.5 degrees by the mounting plate, the shaft sleeve and the connecting shaft, and the sliding pedals which are matched with the inclined planes can be switched between the inclined planes of the expanding core. The oil cylinder drives the connecting shaft and the expanding core to move in the up-down direction, the sliding pedals are matched with the inclined planes of the expanding core, so that the eight sliding pedals perform centripetal motion and centrifugal motion synchronously along the insides of the eight T-shaped chutes which are distributed uniformly and formed in the cavities of the flange plate and the chassis, and a high-precision synchronous expanding and shrinking function of the eight sliding pedals is fulfilled; and because height difference exists between the two groups of inclined planes distributed uniformly at intervals on side surfaces of the expanding core, the servo motor drives the expanding core to rotate at an angle of 22.5 degrees, the sliding pedals which are matched with the inclined planes can be switched between the inclined planes of the expanding core, the expanding and shrinking diameters of the sliding pedals are changed in two different ranges, and finally, large-stroke expanding and shrinking of the sliding pedals is realized. The corresponding pin holes are formed in the chassis and the flange plate, the positioning pins are respectively connected with the pin holes of the chassis and the flange plate, and therefore, the assembly accuracy of the chassis and the flange plate is guaranteed.

Before actual use, an oil cylinder rod of the oil cylinder is in a shrinkage state, and under the effect of the springs, the inclined planes of the sliding pedals are in contact with the upper conical surface of the expanding core. During actual use, a flange surface of a wheel is in contact with the flange plate of the large-stroke tensioning device in the wheel machining process, the sliding pedals are positioned in a center hole, according to the diameter of the center hole of the wheel, the servo motor drives the expanding core to rotate at a specific angle, so that the inclined planes of the sliding pedals are matched with the corresponding inclined planes of the expanding core, then the oil cylinder begins to work, and overcomes the elasticity of the springs to drive the connecting shaft and the expanding core to move upwards, the sliding pedals synchronously move outwards along the insides of the eight uniformly distributed T-shaped chutes formed in the cavities of the flange plate and the chassis, finally, the sliding pedals are in contact with the center hole of the wheel, the positioning and tensioning process of the wheel is finished, and then the next operation of the wheel can be carried out. After the operation is finished, the oil cylinder drives the expanding core to move downwards, under the effect of the springs, the eight sliding pedals synchronously perform central motion along the insides of the eight uniformly distributed T-shaped chutes formed in the cavities of the flange plate and the chassis, the sliding pedals are disconnected from the center hole of the wheel, and then the wheel is taken down. Thus, the tensioning and loosening operations of the wheel are finished by the device.

The large-stroke tensioning device in the wheel machining process can meet requirements of clamping and positioning of the wheel, and meanwhile has the characteristics of simple structure, convenience in manufacturing, stable performance and capability of meeting machining requirements on precision.

Figure 1:
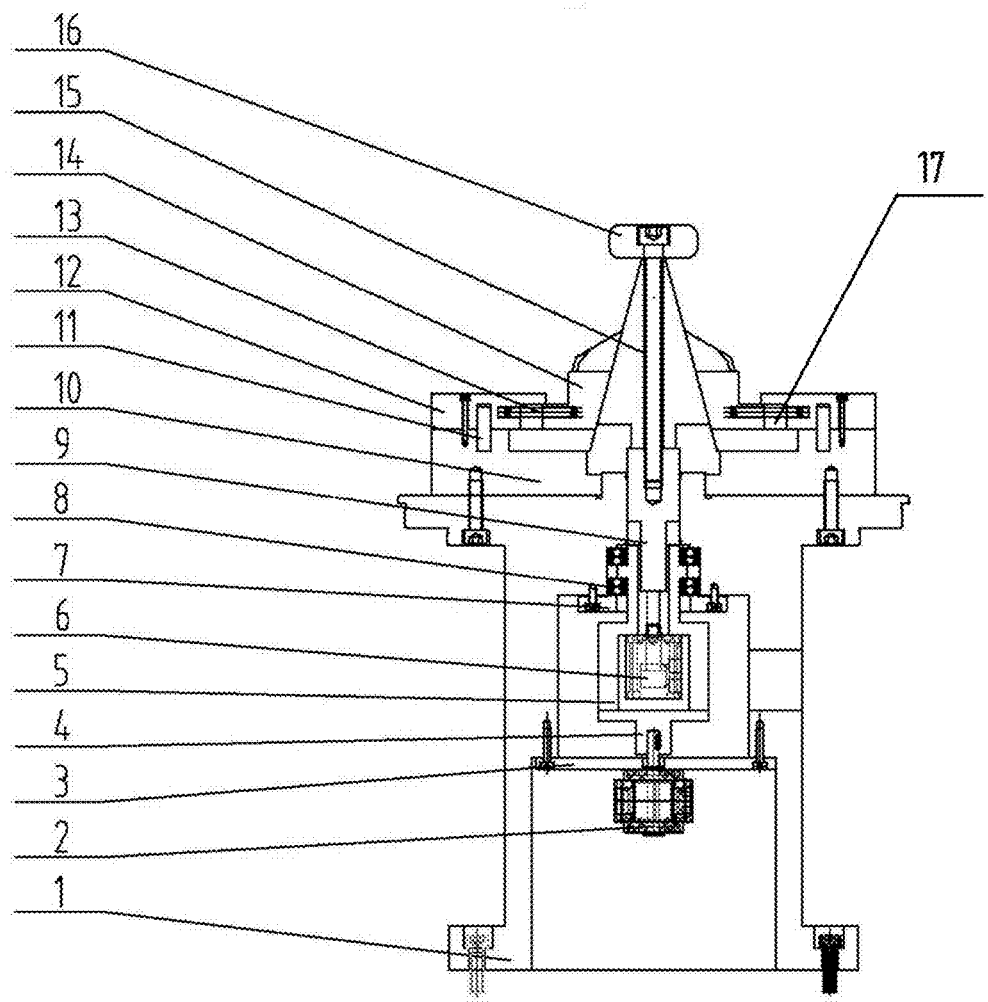
FIG. 1 is a large-stroke tensioning device in a wheel machining process provided by the invention.
Figure 2:
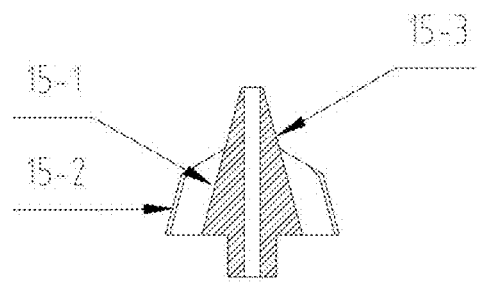
FIG. 2 is a structure diagram of an expanding core in a large-stroke tensioning device in a wheel machining process provided by the invention.
Figure 3:
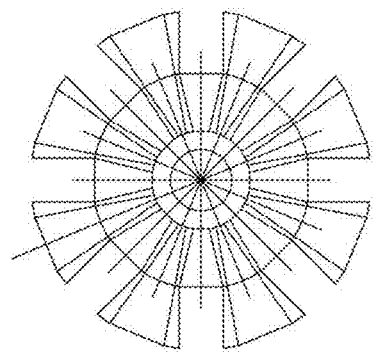
FIG. 3 is a structure diagram of an expanding core in a large-stroke tensioning device in a wheel machining process provided by the invention.
Figure 4:
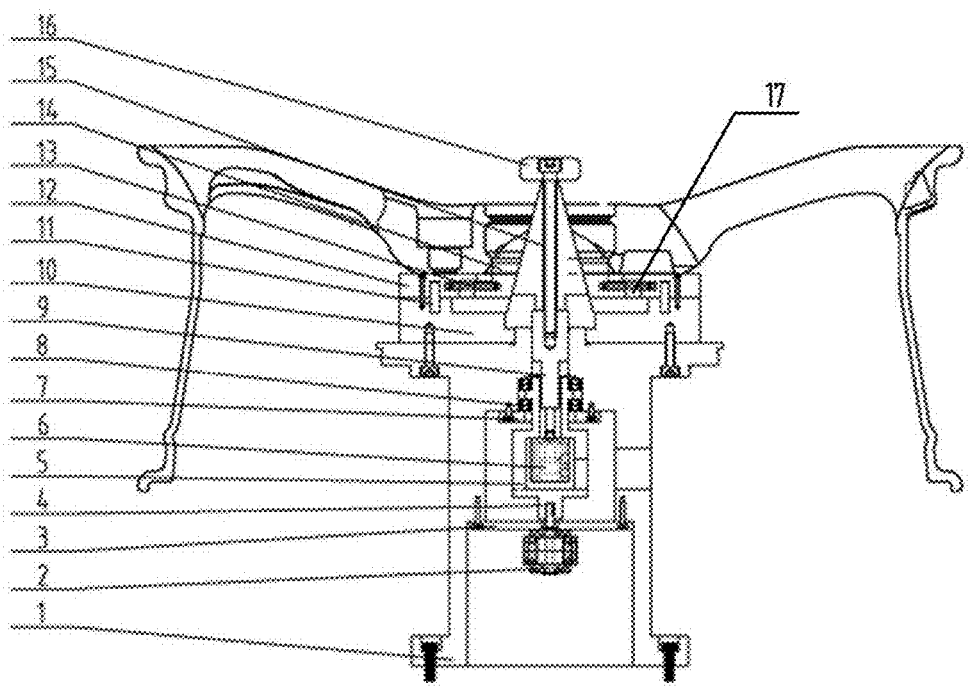
FIG. 4 is a structure diagram of a large-stroke tensioning device in a wheel machining process provided by the invention during working.

In the figures, 1—base, 2—servo motor, 3—mounting plate, 4—connecting plate, 5—shaft sleeve, 6—oil cylinder, 7—gland, 8—bearing, 9—connecting shaft, 10—chassis, 11—positioning pin, 12—flange plate, 13—spring, 14—sliding pedal, 15—expanding core, 16—protector and 17—chute.

DETAILED DESCRIPTION OF THE INVENTION

Hereinafter, details and working conditions of a specific device provided by the invention will be described with reference to the drawings.

A large-stroke tensioning device in a wheel machining process consists of a base 1, a servo motor 2, a mounting plate 3, a connecting plate 4, a shaft sleeve 5, an oil cylinder 6, a gland 7, bearings 8, a connecting shaft 9, a chassis 10, positioning pins 11, a flange plate 12, springs 13, sliding pedals 14, an expanding core 15 and a protector 16. The mounting plate 3, the gland 7 and the chassis 10 are fixed on the base 1, the servo motor 2 is mounted on the mounting plate 3, the shaft sleeve 5 is mounted on the base 1 by the two rows of bearings 8 and the gland 7, the oil cylinder 6 is fixed inside the shaft sleeve 5, an output end of the oil cylinder 6 is fixed to the connecting shaft 9, the servo motor 2 is connected with the shaft sleeve 5 by the connecting plate 4, the expanding core 15 is connected with the shaft sleeve 5 by the connecting shaft 9, the expanding core 15, the connecting shaft 9 and the shaft sleeve 5 are locked in the peripheral direction and do not rotate relatively, the connecting shaft 9 and the shaft sleeve 5 can relatively move in the axial direction, the flange plate 12 is fixed on the chassis 10, eight T-shaped chutes 17 which are uniformly distributed are formed in cavities of the flange plate 12 and the chassis 10, bottom surfaces of eight sliding pedals 14 are in one-to-one correspondence to the eight T-shaped chutes 17 respectively, the sliding pedals 14 can smoothly slide in the chutes 17 highly precisely, the inner side wall of each sliding pedal 14 is a 15-degree inclined plane, and the flange plate 12 is connected with the eight sliding pedals 14 by eight springs 13; two groups of 15-degree inclined planes 15-1 and 15-2 which are uniformly distributed at intervals are arranged on side surfaces of the expanding core 15, the number of the inclined planes in each group is eight, height difference exists between each two inclined planes, side walls of the upper ends of the two groups of inclined planes are joined at a conical surface 15-3, under the combined action of the tension of the oil cylinder 6 and the elasticity of the springs, side walls of the sliding pedals 14 are in contact with the conical surface 15-3 of the expanding core 15 when the expanding core 15 is located at the bottommost position, the servo motor 2 drives the expanding core 15 to rotate at an angle of 22.5 degrees by the mounting plate 3, the shaft sleeve 5 and the connecting shaft 9, and the sliding pedals 14 which are matched with the inclined planes can be switched between the inclined planes 15-1 and the inclined planes 15-2 of the expanding core 15. The oil cylinder 6 drives the connecting shaft 9 and the expanding core 15 to move in the up-down direction, the sliding pedals 14 are matched with the inclined planes of the expanding core 15, so that the eight sliding pedals 14 perform centripetal motion and centrifugal motion synchronously along the insides of the eight uniformly distributed T-shaped chutes 17 formed in the cavities of the flange plate 12 and the chassis 10, and a high-precision synchronous expanding and shrinking function of the eight sliding pedals 14 is fulfilled; and because height difference exists between the two groups of inclined planes which are uniformly distributed at intervals on the side surface of the expanding core 15, the servo motor 2 drives the expanding core 15 to rotate at an angle of 22.5 degrees, the sliding pedals 14 which are matched with the inclined planes can be switched between the inclined planes 15-1 and the inclined planes 15-2 of the expanding core 15, the expanding and shrinking diameters of the sliding pedals 14 are changed in two different ranges, and finally, large-stroke expanding and shrinking of the sliding pedals 14 is realized. Corresponding pin holes are formed in the chassis 10 and the flange plate 12, the positioning pins 11 are respectively connected with the pin holes of the chassis 10 and the flange plate 12, and therefore, assembly accuracy of the chassis 10 and the flange plate 12 is guaranteed.

Before actual use, an oil cylinder rod of the oil cylinder 6 is in a shrinkage state, and under the effect of the springs, the inclined planes of the sliding pedals 14 are in contact with the upper conical surface of the expanding core 15. During actual use, a flange surface of a wheel is in contact with the flange plate 12 of the large-stroke tensioning device in the wheel machining process, the sliding pedals 14 are positioned in a center hole, according to the diameter of the center hole of the wheel, the servo motor 2 drives the expanding core 15 to rotate at a specific angle, so that the inclined planes of the sliding pedals 14 are matched with the corresponding inclined planes of the expanding core 15, then the oil cylinder begins to work, and the oil cylinder 6 overcomes the elasticity of the springs to drive the connecting shaft 9 and the expanding core 15 to move upwards, the sliding pedals 14 are matched with the inclined planes of the expanding core 15, so that the eight sliding pedals 14 synchronously move outwards along the insides of the eight uniformly distributed T-shaped chutes 17 formed in cavities of the flange plate 12 and the chassis 10, finally, the sliding pedals 14 are in contact with the center hole of the wheel, the positioning and tensioning process of the wheel is finished, and then the next operation of the wheel can be carried out. After the operation is finished, the oil cylinder 6 drives the expanding core 15 to move downwards, under the effect of the springs 13, the sliding pedals 14 synchronously perform central motion along the insides of the eight uniformly distributed T-shaped chutes 17 formed in the cavities of the flange plate 12 and the chassis 10, the sliding pedals 14 are disconnected from the center hole of the wheel, and then the wheel is taken down. Thus, the tensioning and loosening operations of the wheel are finished by the device.

The invention claimed is:

1. A large-stroke tensioning device in a wheel machining process, comprising a base, a servo motor, a mounting plate, a connecting plate, a shaft sleeve, an oil cylinder, a gland, bearings, a connecting shaft, a chassis, positioning pins, a flange plate, springs, sliding pedals, a conical core and a protecting cover, wherein the mounting plate, the gland and the chassis are fixed on the base, the servo motor is mounted on the mounting plate, the shaft sleeve is mounted on the base by the two rows of bearings and the gland, the oil cylinder is fixed in the shaft sleeve, an output end of the oil cylinder is fixed to the connecting shaft, the servo motor is connected with the shaft sleeve by the connecting plate, the conical core is connected with the shaft sleeve by the connecting shaft, the conical core, the connecting shaft and the shaft sleeve are locked in the peripheral direction and do not rotate relatively, the connecting shaft and the shaft sleeve can relatively move in the axial direction, the flange plate is fixed on the chassis, eight T-shaped chutes are distributed uniformly and circumferentially in cavities of the flange plate and the chassis, each of bottom surfaces of the eight sliding pedals is received in a corresponding one of the eight T-shaped chutes respectively, so that the sliding pedals can smoothly slide in the chutes highly precisely, the inner side wall of each sliding pedal is a 15-degree inclined plane, and the flange plate is connected with the eight sliding pedals by the eight springs; two groups of 15-degree inclined planes which are uniformly and circumferentially distributed at intervals are arranged on side surfaces of the conical core, and the two groups of the inclined planes are arranged in an alternative order, the number of the inclined planes in each group is eight, height difference exists between each two of inclined planes, side walls of the upper ends of the two groups of inclined planes are joined at a conical surface, under the combined action of the tension of the oil cylinder and the elasticity of the springs, side walls of the sliding pedals are in contact with the conical surface of the conical core when the conical core is located at the bottommost position, the servo motor drives the conical core to rotate at an angle of 22.5 degrees by the mounting plate, the shaft sleeve and the connecting shaft, and the sliding pedals which are matched with the inclined planes can be switched between the two groups of the inclined planes of the conical core; and when the oil cylinder drives the connecting shaft and the conical core to move in the up-down direction, by cooperation of the inclined planes of the sliding pedals with the inclined planes of the conical core, the eight sliding pedals synchronously move centripetally and centrifugally along the eight T-shaped chutes formed in the cavities of the flange plate and the chassis.

2. The large-stroke tensioning device in the wheel machining process according to claim 1, wherein pin holes are formed in the chassis and the flange plate, the positioning pins are respectively connected with the pin holes of the chassis and the flange plate, and therefore, the assembly accuracy of the chassis and the flange plate is guaranteed.

* * * * *